April 2, 1968  D. W. BEDDO  3,375,896
LOW-FREQUENCY VIBRATORY SEISMIC SURVEYING
Filed April 15, 1966  2 Sheets-Sheet 1
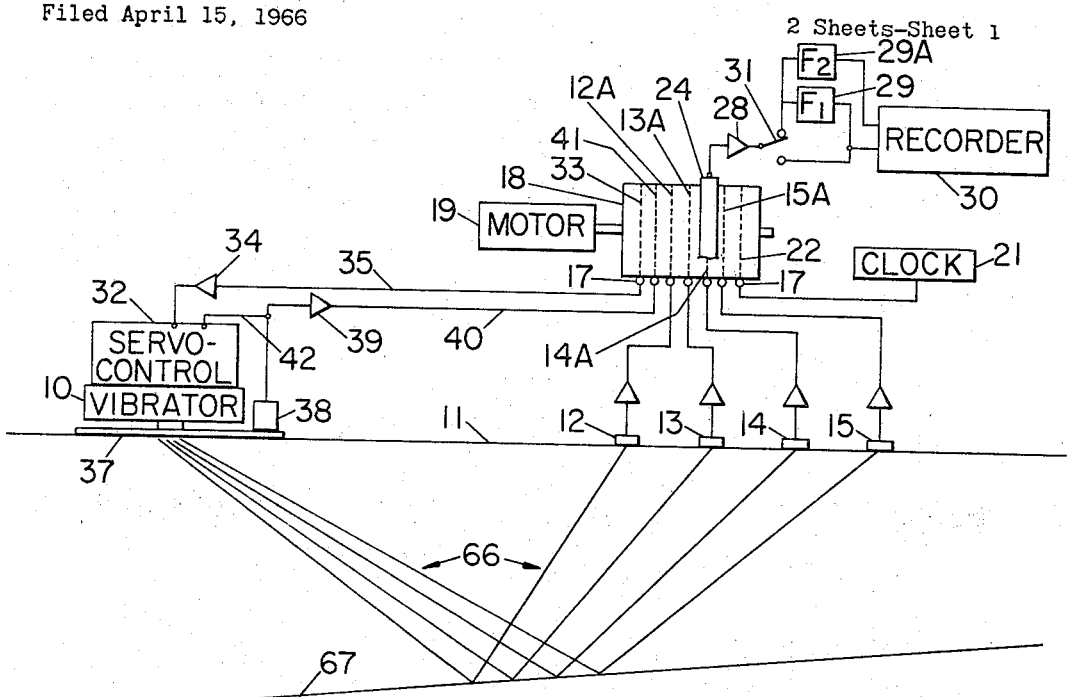
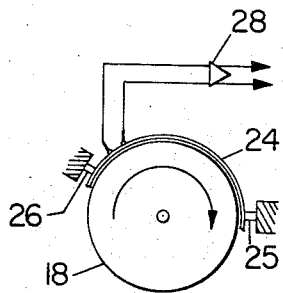
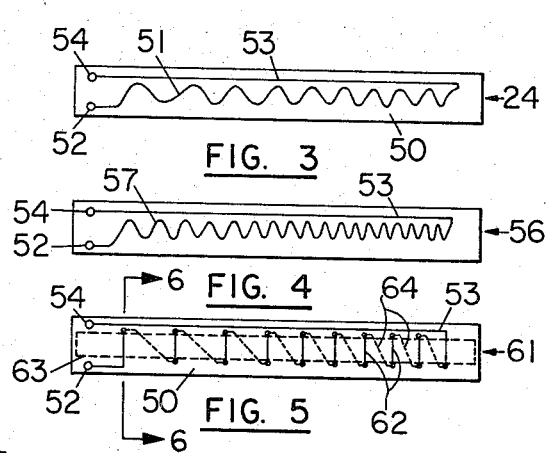
DEARAL W. BEDDO
INVENTOR.
BY *Newell Pottoy*
ATTORNEY

United States Patent Office 3,375,896
Patented Apr. 2, 1968

---

3,375,896
LOW-FREQUENCY VIBRATORY SEISMIC SURVEYING
Dearal W. Beddo, Midland, Tex., assignor to Pan American Petroleum Corporation, Tulsa, Okla., a corporation of Delaware
Filed Apr. 15, 1966, Ser. No. 542,936
8 Claims. (Cl. 181—.5)

ABSTRACT OF THE DISCLOSURE

In low-frequency vibratory seismic surveying, below the efficient driving range of a servo-controlled vibrator, control impulses are applied to the vibrator input in a time sequence corresponding to successive wave periods of a low-frequency sine-wave frequency sweep. This provides not only increased energy at the low frequencies, as compared with sine-wave control, but also, and simultaneously, energy at second and higher harmonics useful for obtaining reflections from shallow interfaces.

---

This invention relates to seismic geophysical surveying for oil and gas and is directed particularly to vibratory seismic surveying utilizing one or more pilot-signal-controlled vibrators as the source of input energy. More specifically, it is directed to vibratory seismic surveying with conventional pilot-signal-controlled vibrators requiring lower frequencies of input energy than such vibrators can ordinarily generate with a sinusoidal form and with useful amplitude. By the use of particular forms of pilot signal for vibrator control it has been found that a vibrator can generate waves of substantial and useful amplitude at frequencies far below the limiting frequency of sinusoidal output waveform.

Seismic geophysical surveying utilizing as the input energy continuous waves, as differentiated from impulses generated by explosive detonations, weight-drop impacts, and similar impulsive sources, has generally utilized vibrators that produce seismic waves in the frequency range from about 15 or 20 to about 80 or 90 cycles per second. This range of frequencies is satisfactory for exploration of most areas and depths where oil and gas are found, but occasionally this frequency range is insufficient. One example of an important oil and gas-producing region where the typical 20 to 80-cycle vibrator input signal range is too limited is the Delaware Basin of New Mexico and West Texas. In parts of this area, the ground surface is underlain by wind-blown or other fill material of such widely varying thickness and such abrupt and extreme lateral variations that the usual methods of seismic exploration and signal enhancement are partly or completely ineffective. Due apparently to the extremely wide variations of velocity, scattering, and absorption of seismic waves in the usual frequency range of 20 to 80 cycles per second, conventional seismic records may completely fail to provide recognizable reflections that persist over sufficient horizontal distances to provide meaningful maps. This is true in spite of all efforts to improve the signal-to-noise ratio by such usual techniques as utilizing special arrays of sources and receivers and achieving multifold subsurface coverage.

In the case of the Delaware Basin problem, it has been recognized that only relatively low-frequency seismic waves, typically less than about 15 cycles per second, can provide useful data. Due to their relatively great wave length, low-frequency waves appear to be less affected and scattered by the heterogeneous fill material than are waves of the usual frequencies. Low-frequency waves can thus penetrate to and be reflected from depths of interest with sufficient amplitude, relative to their scattering and absorption by the fill, to convey useful information.

The ability of continuous-wave methods of prospecting, as exemplified by that provided under the well-known trade name "Vibroseis," to discriminate against random noise and interference waves and in favor of signals is generally recognized. They frequently fail in the Delaware Basin, however, because the presently available pilot-signal-controlled vibrators, designed to operate effectively from 15 or 20 to 80 or 90 cycles per second simply are unable, when actuated by sinusoidal pilot signals below about 15 cycles per second, and particularly, less than 10 cycles per second, to introduce a sufficient amount of low-frequency energy into the ground to penetrate the fill materials and be detectable above the background of interference and noise. By the term "low frequency" in this sense is meant substantial amounts of energy below the usual 15 to 20-cycle lower limit of the vibrator range, and also preferably including some energy below 10 cycles per second. While the resolving power of low-frequency waves is recognized as poor for separating reflections closely spaced in time, this is not important in prospecting the Delaware Basin and like problem areas, where the primary consideration is to obtain any usable signals at all from the depths of interest, in the presence of overwhelming noise.

Briefly stated, I have found that the limitation of present vibrators of the pilot-signal-controlled type in generating low-frequency waves can be at least in part avoided or overcome by driving a vibrator, not with low-frequency wave trains of variable-frequency sinusoidal form as is done in the 20 to 80-cycle per second range of "normal" operation, but rather with a succession of primarily unidirectional impulses all of similar form and amplitude, spaced in time by successive intervals which correspond to the successive wave periods of a continuously varying-frequency sinusoidal wave train of less than about 15 cycles per second frequency, most of which intervals therefore differ from each other and are greater than the 67 milliseconds that represent the period of a 15-cycle per second wave frequency. This procedure has at least a twofold benefit. Not only does the vibrator introduce into the ground substantial amounts of energy in the range of the desired low frequencies below about 15 cycles per second, but also and at the same time, higher harmonics of the low-frequency energy are introduced into the ground. The low-frequency waves penetrate to and return from the greater depths of interest, at the same time that the higher harmonic-frequency waves are reflected by the shallow reflecting interfaces. Thus, the mapping of both deep and shallow interfaces is simultaneously achieved. This results in an important economy of operation in that additional field-operating time is not required for vibrating at the higher frequencies to obtain data on the shallower interfaces.

Stated otherwise, the precisely timed succession of similar impulses which a vibrator imparts to the ground in accordance with this invention, although in some degree distorted relative to a typical varying-frequency sinusoidal wave train, correspond to a number of simultaneous sinusoidal wave trains, harmonically related. For example, successive unidirectional pulses spaced in time by the successive wave periods of an 8 to 16-cycle per second sinusoidal frequency sweep, produce energy not only in the low-frequency (first-harmonic) range of 8 to 16 cycles per second, but also in the second-harmonic range of 16 to 32 cycles per second, the third-harmonic range of 24 to 48 cycles per second, and even to some extent in the fourth-harmonic range of 32 to 64 cycles per second, all simultaneously.

Analysis of the resulting received waves can then advantageously be performed in two or more different ways.

The received waves can first be analyzed for each occurrence of an 8 to 16-cycle per second sinusoidal wave train, of which the successive wave periods are equal to the successive time intervals between vibrator input impulses, time-compressed to produce impulses indicating travel times, which travel times will be for the deeper reflecting interfaces of interest. The same received waves can also be analyzed, simultaneously or in a separate procedure, for occurrences of a 16 to 32-cycle per second sinusoidal wave train (i.e., the second harmonic of the 8 to 16-cycle train), and time-compressed to obtain impulses indicating travel times to shallower interfaces. Likewise, analysis and time compression for the higher harmonic-frequency ranges can be carried out sequentially, or simultaneously utilizing a novel correlator head, for the information they contain about the shallow reflections.

This will be better understood by reference to the accompanying drawings forming a part of this application and illustrating typical and preferred embodiments of my invention. In these drawings, FIGURE 1 shows diagrammatically a field recording apparatus for use in accordance with the invention;

FIGURE 2 is a partial end view of the recorder of FIGURE 1;

FIGURES 3, 4 and 5 are diagrammatic views of different correlator heads used in the recorder of FIGURES 1 and 2;

FIGURE 6 is an enlarged cross section of the correlator head of FIGURE 5 on the line 6—6.

Figure 7:
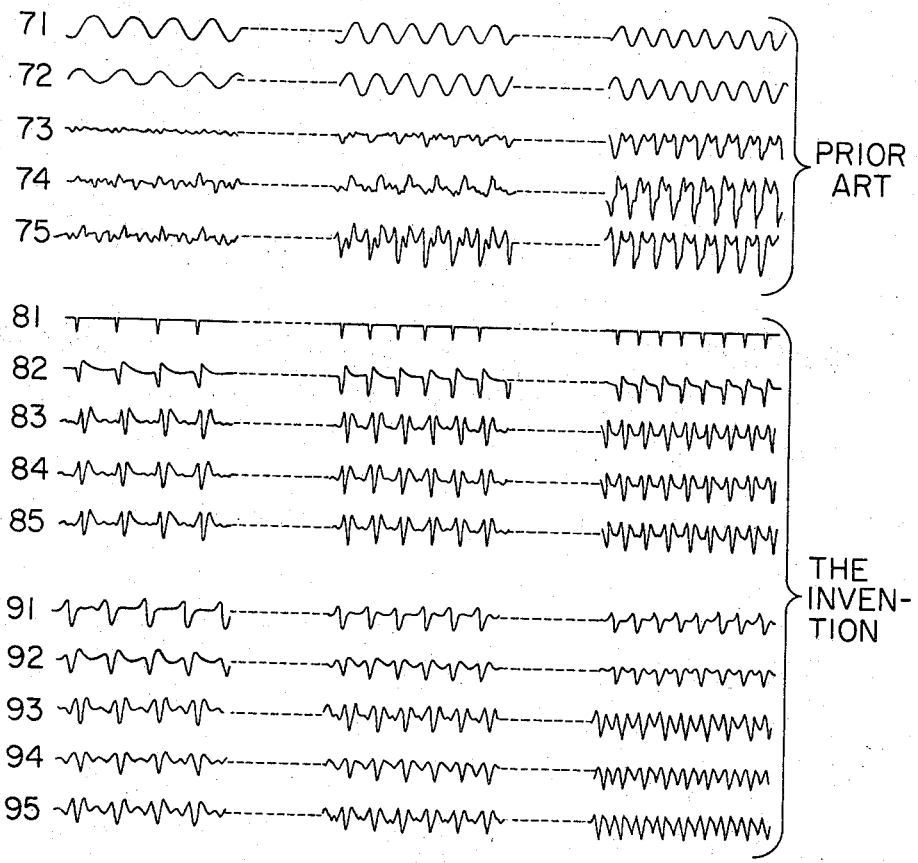
FIGURE 7 is a tracing of portions of recordings made showing, in a form suitable for comparison, results produced according to the prior art and according to the present invention.

Referring now to these drawings in detail and particularly to FIGURE 1 thereof, this figure shows in highly diagrammatic form the essential elements of a vibratory seismic field recording system of conventional type, which may be operated either according to the prior art or in accordance with this invention. Thus, the energy source is a pilot-signal-controlled vibrator 10 suitably held in contact with the ground surface 11. Positioned at some desired distance from vibrator 10 is a conventional array of seismic-wave detectors 12, 13, 14 and 15. Detectors 12–15 are respectively connected to corresponding magnetic recording heads 17 of a multi-channel magnetic drum recorder 18, driven by a constant-speed motor 19. The detected signals are thus recorded as corresponding magnetic traces 12a–15a on the surface of drum 18. For time reference or control, signals from a clock 21, for example, a piezoelectric crystal-controlled oscillator, are recorded as a trace 22.

As more clearly appears in FIGURE 2, adjacent drum 18 is a correlator head 24, held stationary by supports 25 and 26, and curved so as to make light frictional contact with the surface of drum 18. Head 20 extends lengthwise along and is centered over any chosen one, such as 14a, of the detector traces 12a–15a. The output terminals of head 24 are connected through an amplifier 28 and filters 29 and 29a to a visible-trace recorder 30. By a switch 31 at the output of amplifier 28, filters 29 and 29a can be disconnected and the amplifier output fed directly to recorder 30.

The vibrator 10 is preferably any one of several commercially available types that are controlled by a servo-mechanism 32, which receives and follows electrical pilot signals from a pre-recorded trace 33 on drum 18, through an amplifier 34 and connecting lead 35, to produce corresponding motions of the vibrator base plate 37 in contact with ground surface 11. Thus, vibrator 10 may be any of several known electro-hydraulic types employing a piston actuated by hydraulic fluid under high pressure alternately directed to the upper and lower piston faces by a pilot-valve mechanism responsive to the wave form of the electrical input pilot signal, to produce corresponding motion of the base plate 37. Alternatively, vibrator 10 may be a known electro-magnetic type containing a coil that reciprocates in a magnetic field when excited with alternating or reversing current of appropriate frequency, which frequency is controlled by the electrical pilot signal, to produce by the mechanical oscillation of the coil relative to the surrounding magnetic field, a correspondingly varying force against the earth's surface. In some cases, vibrator 10 may also be one using rotating eccentric weight means at changing rotational speeds as the means for producing varying-frequency seismic waves.

Preferably, the base plate 37 of vibrator 10 carries a motion detector 38 connected through an amplifier 39 and lead 40 to the recorder for recording a monitor trace 41 on the drum 18. Also, by a connecting lead 42, the base-plate signal from detector 38 may be fed to the servo-control mechanism 32 as a feedback to cause the vibrator 10 to follow more accurately the pre-recorded pilot wave form on trace 33.

Referring now to FIGURE 3, this figure shows further details of a typical correlator head 24. Thus, the head 24 comprises a thin, elongated, flexible strip of insulating plastic 50 having attached or fixed to its surface in any suitable manner, for example, by engraving and electrical circuit printing techniques, an undulating electrical conductor 51 extending lengthwise of the strip 50 and shaped in the form of an oscillographic trace of a sinusoidal, time-linear, varying-frequency sweep. One end of the wave-form conductor 51 is connected to a terminal 52, while the other end is connected to a corresponding terminal 54 by a longitudinal conductor 53 extending along the length of the strip 50 parallel to the central-axis line of conductor 51. From terminals 52 and 54 extend the input leads of amplifier 58 in FIGURES 1 and 2.

The operation of the system thus far described will be apparent to those skilled in the art of vibratory prospecting, and may be briefly described as follows: The pilot wave-form trace of the conductor 51 on head 24, and the magnetic pilot-signal trace 33 on the surface of drum 18 are precisely interrelated as regards the wave form of the conductor 51 and the distribution of magnetization along the length of trace 33. In fact, one may be derived from the other or both may be prepared from a common master wave form or vibratory source. A typical cycle of vibration and recording takes place during one rotation of drum 18. Trace 33 is scanned by the playback head 17, and the resulting electrical pilot signal sent over lead 35 and amplifier 34 is applied to servo-control 32. In response to control 32, vibrator 10 actuates its base plate 37 to cause it to oscillate in step with the varying-frequency pilot wave form 51, as it is derived from trace 33. This motion of base plate 37 and of the ground surface 11, with which it is held in contact, is recorded as the monitor trace 41 on drum 18.

The time duration of the vibratory signal may be chosen in accordance with the usual criteria known in the "Vibroseis" art (see U.S. Patent 2,989,726) and may thus approximate the travel time of the desired seismic waves. As an example, a 3.5-second vibration time is frequently used in the Delaware Basin, where strong transmission of longer-time signals by a shallow refracting layer may mask weaker, deep reflections. That is, the time duration of the input signal "approximates" desired-wave travel times in the sense that it may be from ½ to 2 times the travel times of a deep seismic reflection of interest. After travel through the earth by various paths and reflection from subsurface interfaces, one set of such paths 66 and a typical interface 67 being shown in FIGURE 1, the various returning waves are received by detectors 12–15 and recorded on drum 18 as corresponding traces 12a–15a.

These traces are ordinarily not interpretable as received, as they consist of many occurrences of the input signal in the form of overlapping wave trains each representing one travel path for the elongated input wave train. Accordingly, they must be analyzed in such a way as to detect these occurrences and time-compress the overlapping wave trains into separated shortened impulses respectively indicating the travel times. Cross-correlation of the input and the received wave trains is one good procedure for effecting this time compression, particularly for time-linear frequency sweeps, as it also strongly discriminates against random noise and interference waves.

Playback of the traces 12a–15a, with correlation, as visible traces suitable for interpretation, using the recorder 30, is also well understood by those in the vibratory prospecting art, and may be briefly described as follows: Each of magnetic traces 12a–15a has a magnetization varying along its length in amplitude and polarity in accordance with the seismic signals received by the corresponding one of detectors 12–15. As drum 18 rotates relative to the correlator head 24, as shown in FIGURE 2, this head, with the conductor trace 51 facing the surface of drum 18, exposes the conductor 51 to the spatially varying magnetization pattern along the trace (for example, trace 14a). As the drum surface moves, the magnetic flux, entering or leaving the surface of drum 18 along the length of the trace, cuts the adjacent parts of the conductor 51. This produces a varying voltage at the terminals 52, 54, which is amplified by the amplifier 28, filtered, if desired, by the filter 29 and recorded as a visible trace by the recorder 30. The manner in which this approximates the true cross-correlation function is well known in the art and is explained fully, for example, in U.S. Patent 3,174,142 Mallinckrodt, and particularly FIGURES 2, 4 and 5 of that patent.

In conventional vibratory seismic surveying, the pre-recorded pilot signal of trace 33, as represented by the conductor 51 on correlator head 24, might be a sinusoidal frequency sweep from 20 to 60 cycles per second during a time of 3.5 seconds, and the visible traces recorded by recorder 30 would be the conventional traces obtained in "Vibroseis" prospecting. That is, the travel times of reflected seismic waves would be indicated by the occurrence of impulses that align themselves across an array of traces produced by cross-correlation of the received waves with the input-wave counterpart.

When the system of FIGURE 1 is operated in accordance with the present invention, however, the conductive trace 51 on correlator head 24 of FIGURE 3 typically represents a 7-second sinusoidal low-frequency sweep of, for example, from 8 to 16 cycles per second, but the pre-recorded pilot signal of trace 33 is quite different in form from the sinusoidal conductive trace 51. This will be better understood by reference to FIGURE 7, which was traced from portions of an actual recording made in the process of utilizing an 8 to 16-cycle per second frequency sweep, in which the frequency varied linearly with time. The traces to the left of FIGURE 7 represent typical cycles at the low-frequency or 8-cycle end of the sweep, the center band of traces corresponds to a frequency near the middle of the sweep, i.e., about 12 cycles, while the band of traces to the right shows the upper end of the sweep, and is thus about 15 to 16 cycles per second. As the total time length of the sweep in this example was about 7 seconds, it thus contained many more cycles of oscillation than those traced, the omission of intermediate cycles being indicated by the dotted lines.

Trace 71 of FIGURE 7 is a prototype or pilot trace that represents the exact shape of the wave-form conductor 51 of a correlator head 24, for a 7-second length of time, for a time-linear sinusoidal frequency sweep from 8 to 16 cycles per second. Trace 72 is the form of the electrical pilot signal transmitted to the servo-control 32, by the playback of pre-recorded trace 33 (in sinusoidal sweep form corresponding to conductor 51) through amplifier 34 and conductor 35, to cause the vibrator 10 to drive its base plate 37. Traces 73, 74, and 75 are the three signals respectively produced by a base-plate motion detector 38 on three different vibrators in contact with the ground surface at a given test location in the Delaware Basin.

These traces show both the considerable and unpredictable variations in amount of energy input into the earth, as well as the extreme wave-form distortion that can occur when actuation of a vibrator is attempted by low-frequency sine-wave pilot signals below the normal frequency range of vibrator operation. Traces 71–75 thus represent the results of operation according to the teachings of the prior art in vibratory seismic surveying.

By contrast, traces 81–85 and 91–95 represent operations and results obtained in accordance with the present invention. They are directly comparable with traces 71–75, as all of these traces were made with the same three vibrators in exactly the same positions on the ground surface. Only the wave form of the pre-recorded trace 33 on drum 18, used to actuate the vibrators, was varied.

Trace 81 corresponds to trace 71 and, like it, is the prototype for the pre-recorded trace 33 and the ground-surface input wave, but consists of brief unidirectional pulses or spikes spaced in time by the periods of the successive sine waves of trace 71. Trace 82, like trace 72, is the wave form of the electrical pilot signal transmitted to the servo-control 32 by playback of trace 33, in the form of trace 81. Traces 83, 84 and 85 are the three baseplate signals from the three vibrators, respectively corresponding to the traces 73, 74, and 75. As is evident from inspection and comparison of the various traces, the baseplate motion, and the motion of the ground with which it maintains contact, have a relatively uniform amplitude for all parts of the sweep and contain a substantial amount of the fundamental (first-harmonic) frequency at all parts of the 8 to 16-cycle per second frequency range. It is also obvious that appreciable amounts of second-harmonic frequencies (16–32 cycles per second) are also present, as well as some third and higher harmonic frequencies.

Traces 91–95 represent a preferred embodiment of the invention. In this trace the prototype wave form 91 consists of successive Z-shaped pulses, all of similar form and variably spaced in time, like the spikes of trace 81, by the periods of the successive sine waves of trace 71. Trace 92 shows the form of the electrical pilot-signal input to servo-control 32 when track 33 has the form of trace 91. As is apparent from the three base-plate motion traces 93, 94, and 95, not only are the wave forms of the produced seismic waves relatively uniform in amplitude, both as among the three vibrators and throughout the entire low-frequency sweep range, but also the wave form consists largely of only first (8–16 cycles per second) and second (16–32 cycles per second) harmonics. The content of third and higher harmonics is somewhat reduced, as compared with traces 83, 84 and 85.

The pilot or control voltage, as represented by traces 82 and 92, is applied to servo-control 32 in a polarity to produce initially downward impulsive motions of each vibrator base plate 37 and of the earth's surface in contact therewith. The induced earth-particle motions of the seismic waves thus created are therefore initially downward also, and thus represent pressure increases or compressions rather than pressure decreases or rarefactions, as they travel as seismic waves through the earth medium. Experiments performed utilizing the pulses of traces 82 and 92 with an opposite polarity, to produce initially upward earth-particle motions or rarefactions, gave generally inferior results to those shown here.

The resulting seismic waves, as produced by vibration according to traces 81–85 or 91–95, after travel through the earth, detection by detectors 12–15, and recording as traces 12a–15a, are analyzed, not by the usual counterpart of the input signal, which would be either trace 82 (or 92) or trace 83 (or 93), but preferably by a correlator head as shown in FIGURES 3, 4, or 5 and 6. In other words, one step of analysis for travel times of the received waves is made using head 24 with the wave-form conductor 51 in the form of an 8 to 16-cycle per second sinusoidal varying-frequency sweep, even though the actual input to the earth is non-sinusoidal in form as in traces 82–85 or 92–95.

This analysis gives indications of deep-reflection travel times that appear to correspond to the results expected if the vibrator 10 could accurately follow the sinusoidal sweep trace 72 at constant amplitude and with small wave-form distortion. That is, the fundamental (first harmonic) 8–16-cycle per second frequency content of the received-wave traces resulting from inputs like traces 83–85 and 93–95 is determined and utilized independently of the higher harmonic frequencies also present.

It is to be noted that "fundamental" (or "first harmonic") as used here refers not to a single frequency but to the apparent frequency of each cycle in a signal. If T is the time between adjacent equivalent troughs of the signal (or peaks), the apparent frequency is 1/T. Similarly, the "second harmonic" terminology refers to equivalent ranges of frequencies twice those of the fundamental, and so on.

The same is true of the second and higher harmonics themselves. A second or additional analysis of the same data traces may be performed, according to the invention, by the correlator head 56 of FIGURE 4. This is exactly like the head 24 of FIGURE 3, except that the wave-form conductor 57 has at each point along its length exactly twice the apparent frequency of the wave-form conductor 51 at corresponding points. It thus represents a 16 to 32-cycle per second sinusoidal varying-frequency sweep. The output trace to recorder 30, in a playback using head 56, is thus quite similar to the output trace that would be obtained with a time-linear sinusoidal input sweep by the vibrator 10, from 16 to 32 cycles per second. That is, the second-harmonic content of input traces of 83–85 and 93–95 appears to travel through the earth and provide travel-time indications practically independently of the other harmonic frequencies also present. As might be expected, visible-trace displays of Delaware Basin data traces made using the second-harmonic correlator head 56 show the shallow reflections much more clearly than the deep reflections, which are best shown by playbacks utilizing the sinusoidal correlator head 24 of FIGURE 3. In the same way, analysis can be made for third (24–48 cycles per second) and higher harmonic frequency sweeps by heads with the corresponding sinusoidal variable-frequency sweep wave-form conductors.

In the foregoing analysis steps, the playbacks of each trace are ordinarily performed sequentially, through one correlator head after another. Similar results can be obtained by a single playback through a novel correlator head 61, as shown in FIGURES 5 and 6. FIGURE 5 shows the side of insulating strip 50 that faces the surface of drum 18. Conducting bars or wires 62 are placed in spaced grooves extending transversely across the strip 50 perpendicularly to its length and to the direction of the one of traces 12a–15a adjacent which it is held in place during playback, the spacing between successive grooves and wires 62 corresponding to the wave lengths of the successive sine waves of conductors 51 in FIGURE 3. Extending lengthwise on the side of strip 50 opposite from wires 62 is a strip 63 of magnetic shielding material of high permeability, such as permalloy, mu-metal, or the like. Connections 64, shown as dotted lines in FIGURE 5, extend from each wire 62 to the next adjacent one forming, in effect, a coil with strip 63 as its core.

In operation, with head 61 held adjacent the surface of drum 18, strip 63 acts as a shield preventing flux from the moving recorded trace, such as 14a, from cutting connecting wires 64 and inducing voltage therein, while the flux that cuts wires 62 induces voltages in them representing all of the frequencies, fundamental and higher harmonic, present in the received seismic waves of recorded trace 14a.

If the filter 29 is arranged to have a band pass from 8 to 16 cycles per second, the output of the head 61, as amplified by amplifier 28 and passed through filter 29, resembles the output trace from head 24 of FIGURE 3. If a second filter 29a is adjusted to pass the band from 16 to 32 cycles per second, however, its output resembles correlation with the second-harmonic head 56 of FIGURE 4, while higher-harmonic heads and sweeps can be simulated by higher-frequency pass bands for the filter. Thus, by providing a plurality of different band-pass filters 29, 29a, and so on, for operating simultaneously on the output of amplifier 28, the head 61 at one rotation of drum 18 can provide results generally equivalent to the sequential use of the harmonic heads of FIGURES 3 and 4 and higher-harmonic heads.

The particular forms of input pulse shown by traces 81, 82 and 91, 92 are only two examples of a number of possible pulse forms. As distinguished from the low-frequency sine waves of traces 71, 72, it is apparent that a frequency analysis of each pulse of trace 92 will show that most of its component frequencies fall within the central portion of the normal vibrator operating frequency range of about 20 to 80 cycles per second. Most of the frequency-analysis components of the pulse of trace 82 will be in the upper portion of this range. By contrast, almost the entire 8 to 16-cycle per second sinusoidal sweep of traces 71, 72 is below the normal vibrator range of operating frequencies. Thus, any other pulse form having its major frequency components within the normal 15 (or 20) to (80 or) 90-cycle per second range of vibrator operation should produce results about as satisfactory as the pulses of traces 81, 82 and 91, 92.

The use of a frequency sweep varying linearly with time, and the analysis of the overlapping successions of received waves by cross-correlation to obtain shortened impulses indicating wave travel times have been described only by way of example. Frequency sweeps that vary in amplitude and/or non-linearly in frequency with time may be employed. Other forms of low-frequency vibratory energy input at a plurality of different discrete frequencies can be used, as in McCollum Patent 3,182,743, for example; or a signal consisting of a number of truncated constant-frequency wave trains transmitted in immediate and rapid succession can be used; and other methods than cross-correlation for the analysis and time-compression of the resulting overlapping received-wave trains, such as the Weiner-filtering technique of application S.N. 450,806, filed Apr. 26, 1965, by applicant's co-workers, Daniel Silverman and Sven Treitel, or matched-filtering as in Webster Patent 3,209,317 for example, can be employed. Obviously also, the present invention can be utilized in conjunction with most of the well-known methods of signal enhancement, such as with carefully designed multiple source and/or receiver arrays, multiple subsurface coverage, frequency or velocity filtering, and the like. The scope of the invention, therefore, should not be considered as limited to the details described above, but rather is to be ascertained from the scope of the appended claims.

I claim:

1. A method of vibratory seismic surveying wherein are required low-frequency seismic waves of less than about 15 cycles per second, using a pilot-signal-controlled vibrator capable of generating seismic waves of sinusoidal form and useful amplitude only at frequencies substantially above about 15 cycles per second, which method comprises, over a period of time approximating the travel time of desired seismic waves the steps of (a) driving said vibrator by an appropriate pilot signal to cause it to apply to the earth a succession of downward pressure impulses, all of similar form and amplitude, spaced in time by successive intervals which correspond to the successive wave periods of a continuously varying-frequency sinusoidal wave train of less than about 15 cycles per second and most of which intervals thus differ from each other and are greater than about 67 milliseconds, (b) detecting the resultant seismic waves arriving at a location spaced from said vibrator after travel by various paths through the earth, (c) analyzing said detected waves for each occurrence therein of a harmonic of a varying-frequency-sinusoidal wave train, of which the successive wave periods are equal to said successive time intervals, and (d) producing from said analyzing step an output trace containing for each of said occurrences an impulse indicating the seismic-wave travel time along a corresponding one of said various paths.

2. A method as in claim 1 in which said driving step comprises driving said pilot-signal-controlled vibrator with a pilot signal consisting of a succession of essentially unidirectional impulses, all of similar form and amplitude, spaced in time by said successive intervals, said similar form being one for which the major frequency-analysis components fall within the 15 to 90-cycle per second range of normal operating frequencies of said vibrator.

3. A method as in claim 2 in which said form is one for which the major frequency-analysis components fall within the central portion of said 15 to 90-cycle per second range of normal operating frequencies of said vibrator.

4. A method as in claim 1 in which said driving step comprises driving said pilot-signal-controlled vibrator with a pilot signal consisting of a succession of essentially unidirectional impulses, all of similar form and amplitude, spaced in time by substantially the successive wave periods of a sinusoidal wave train having a frequency varying at least approximately linearly with time over a range of about 2 to 1, most of said range being below about 15 cycles per second.

5. A method as in claim 4 in which said vibrator acts to convert said unidirectional pilot-signal impulses into corresponding downward pressure impulses in the earth, said pressure impulses creating a succession of seismic waves having substantial amounts of energy both at the first and at higher harmonic frequencies of said sinusoidal wave train.

6. A method as in claim 5 in which said analyzing step comprises cross-correlating said detected waves with said linearly time-varying sinusoidal wave train.

7. A method as in claim 5 in which said analyzing step comprises cross-correlating said detected waves with a second or higher harmonic of said linearly time-varying sinusoidal wave train.

8. A method as in claim 5 in which said analyzing step comprises cross-correlating said detected waves using a correlator head simultaneously responsive to said sinusoidal wave train and to its second and higher harmonic frequencies, and band-pass filtering the output of said head through a plurality of band-pass filters each adapted to pass a different one of the harmonics of said sinusoidal wave train.

References Cited

UNITED STATES PATENTS

| | | | |
|---|---|---|---|
| 3,066,754 | 12/1962 | Johnson | 181—.5 |
| 3,209,322 | 9/1965 | Doty | 340—15.5 |
| 3,259,878 | 7/1966 | Mifsud | 340—15.5 |
| 3,264,606 | 8/1966 | Crook et al. | 181—.5 X |
| 3,273,113 | 9/1966 | Lerwill et al. | 340—15.5 |
| 3,286,228 | 11/1966 | Anstey | 340—15.5 |
| 3,221,298 | 11/1965 | Burns | 181—.5 |
| 3,234,504 | 2/1966 | Wischmeyer | 181—.5 |

BENJAMIN A. BORCHELT, *Primary Examiner.*

SAMUEL FEINBERG, *Examiner.*

R. M. SKOLNIK, *Assistant Examiner.*